United States Patent [19]
Gelormino et al.

[11] Patent Number: 5,624,175
[45] Date of Patent: Apr. 29, 1997

[54] BICYCLE SAFETY LIGHT

[75] Inventors: Scott Gelormino, Winsted; Serafino Canino, Torrington, both of Conn.

[73] Assignee: ICC Corporation, Torrington, Conn.

[21] Appl. No.: 106,417

[22] Filed: Aug. 13, 1993

[51] Int. Cl.⁶ .................................................. B62J 6/00
[52] U.S. Cl. ...................... 362/72; 362/158; 362/191; 362/276; 362/800; 362/802
[58] Field of Search ................... 362/72, 158, 191, 362/276, 802, 800

[56]       References Cited

U.S. PATENT DOCUMENTS

| 5,029,205 | 7/1991 | Archer | 362/802 X |
| 5,299,107 | 3/1994 | Ratcliffe et al. | 362/158 |
| 5,333,101 | 7/1994 | McEvoy | 362/802 X |

Primary Examiner—Stephen F. Husar

[57]       ABSTRACT

A safety light for a bicycle. A housing member supports a power source and at least one light source. The light source is electrically connectable to the power source. A motion sensitive switch switches between an open condition and a closed condition in response to motion of the housing member. A control circuit is activated dependent on the open and the closed condition of the motion switching means. The control circuit produces a flashing voltage pulse effective to cause the at least one light source to flash on and off. The control circuit also detects an on-off cycle each time the switching means switches between the open condition and the closed condition in response to motion of the housing member and produces a flashing voltage pulse for a predetermined length of time after detecting a last on-off cycle. In another embodiment, the power source comprises a magnetic member for providing a magnetic field and a conductive coil disposed relative to the magnetic member so that motion of the magnetic member relative to the conductive coil in response to motion of the housing member produces an electric current. In still another embodiment, the power source includes piezo-electric elements which generate electricity when struck by a moving weight. At least one light source supported by the housing member is electrically connectable to the power source for receiving the electric current in response to motion of the housing member.

19 Claims, 18 Drawing Sheets

BICYCLE SAFETY LIGHT

BACKGROUND OF THE INVENTION

The present invention pertains to a bicycle safety light. More particularly, the present invention pertains to a bicycle safety light that is mounted on the spokes of a bicycle tire, and produces a flashing light to increase the visibility of the bicycle when riding at night.

Bicycles are a well known device, and unfortunately, so are the issues of safety associated with their use. The present invention has been developed to address and solve one of the most pressing safety concerns a cyclist has when riding at night. Namely, the lack of visibility of the bicyclist by others, such as motorists. It is well known to provide some degree of added visibility through the addition of reflective surfaces supported by the spokes and/or frame of the bicycle. With these reflecting devices, an external light source such as an oncoming car light, impinges on the reflective surface, and is reflected back to the source (i.e. the cat's driver). These devices are particularly useful when mounted on the spokes of the bicycle. As the bicyclist moves forward, the bicycle's wheels continuously rotate, and thus the reflective devices mounted on the spokes undergo a cycloid movement pattern. The light reflected by the reflective device while moving in this pattern catches the eye of the viewer, thus drawing attention to the cyclist.

It is also well known to dispose a light source, such as a head or tail light to the bicycle at a stationary position, such as in front of the handlebars or behind the seat. Since the light source does not require the external light beam (as the reflective device does), the cyclist can be seen even if the viewer's line of sight is not in line with the external light source (i.e. the head light). However, the stationary mounting at the head of the handlebars or back of seat, is ineffective for producing the better suited cycloid pattern described above. Also, with this orientation of the light source, the light beam is not directed toward the side of the bicycle, and this does not provide adequate side visibility.

A light may be fixed to the spokes of a bicycle. However, such a light would have to be thin enough to pass between the forks supporting the rotating tire, durable enough to sustain extremely hard bumps, and bright enough to be highly visible. In addition, such a light should preferably flash on and off, to be more visually stimulating, and thus more likely to be perceived by a viewer at night.

However, it is difficult to provide such a light source due to a number of practical concerns. For example, the external surfaces of such a bicycle safety light would be constantly exposed to extremes of moisture, temperature, rain, dirt, shocks, and vibrations. Therefore, the housing of such a safety light must be adequately sealed to protect the internal light producing components from the elements. One way to provide integrity for the housing of the safety light would be to hermetically seal it at the factory. However, in this case it would be impossible to replace any internal components, such as a power source, light sources, etc. Therefore, if the power source is a battery, once the factory installed battery has become discharged, the safety light would be ineffective for its intended use since, to replace the battery one would have to break the factory created hermetic seal.

A light source supported on the spokes of a tire is useful, only so long as it is turned on. Therefore, a switch would be needed to alternately supply and disconnect power from a power source. However, the bicyclist, particularly a young child, is apt to forget to flip the switch and turn the light source on. Also, if the light source is powered by, for example, a battery, if the bicyclist forgets to flip the switch off, the battery will drain, making the device useless until such time as the battery is replaced.

There have been prior attempts at providing a safety light for a bicycle which provides a light source mounted on the spokes of the bicycle tire. U.S. Pat. No. 4,176,390, issued to Galbert, discloses a light in which a switch spring is provided for biasing a battery normally out of electrical contact with a bulb when the tire is not rotating. When the tire is rotating, centrifugal force urges the battery against the spring so that the light is turned on. However, this attempt fails to provide the desired flashing light. Also, since the light is constantly on while the tire is rotating, and the bulb is a conventional incandescent light bulb, the battery will tend to drain rather quickly, making the device useless until a fresh battery is installed. Furthermore, as soon as the tire stops rotating (for example, when the bicyclist comes to a road intersection), or if the centrifugal force is slight (such as when walking the bicycle or riding slowly), the light is turned off, making the bicyclist substantially invisible to night traffic.

Another prior attempt, U.S. Pat. No. 4,135,229, issued to Modurkay, teaches a light bulb fixed to a plate supported by the spokes of a bicycle tire. A relatively bulky battery power source is clamped to the tire's hub. The bulb and the battery are connected through a wire. This attempt also provides a constant light source when its switch is turned on, and if the switch is not turned off, the device's incandescent light bulb will quickly drain the battery of power.

In another prior attempt, U.S. Pat. No. 4,787,014, issued to Wodder et al., another safety light is provided. In this attempt, a constant light source is secured to a thin plate supported on the spokes of a bicycle tire. As with Galbert, the light is oriented so that its beam shines toward the rim of the tire (along it longitudinal axis). This orientation appears to be a requirement of these devices, since the light source and battery are relatively long. However, with this orientation, the light source directs a thin beam that will often not be seen unless the viewer is directly in front or behind the cyclist. Stated otherwise, this orientation does not present a light beam directed towards the sides of the bicycle (or perpendicular to the longitudinal axis of the tire). Wodder et al. recognizes that the orientation disclosed in this reference directs a light beam which is obscured by the tire rim. To alleviate this problem, Wodder et al. discloses that a wedge or lip can be used to elevate the light source so a portion of the light beam can be deflected away from the tire rim. However, even with this feature, the light beam is at most elevated only 20 degrees from the tire's longitudinal axis. This orientation still does not provide adequate side visibility.

In another attempt, UK Patent 2,237,368, issued to Wayte, a flashing lamp is provided with a gravity-operated change-over switch. The switch is activated by motion to alternately charge a capacitor from a battery, and then discharge the capacitor through the lamp. In accordance with this reference, the lamp flashes once per wheel revolution. However, the simple circuit construction causes the lamp to stop flashing as soon as the tire stops rotating. Thus, as with the other prior attempts, if the bicyclist momentarily stops, such as at an intersection, there is no light produced and the bicyclist again becomes invisible to night traffic.

The requirement of a battery power source makes these prior attempts less than adequate, since once the battery's power has been drained, no light is produced until a fresh battery is installed. There have been attempts to provide a self-generating power source which uses the tire's rotating motion to drive an electric generator. Examples of prior attempts are: U.S. Pat. No. 4,796,972, issued to Thomas et al.; U.S. Pat. No. 4,191,988, issued to Kumakura; Canadian Patent No. 888928, issued to Choquette et al.; UK Patent No. 2168660, issued to Roberts; and Japanese Patent No. 52-25597, issued to Kaneko. These references, generally, utilize the rotation of the bicycle tire to drive an electric generator. In most cases, the generator consists of a rotationally driven member which is frictionally driven by the bicycle tire. The rotationally driven member causes a permanent magnet to rotate relative to a wire coil so that electricity can be generated. These attempts disclose devices that are relatively expensive, and in most cases add additional bulk and excessive drag on the bicycle.

SUMMARY OF THE INVENTION

The present invention is intended to alleviate the drawbacks of the conventional art. It is an object of the present invention to provide a bicycle safety light which produces a flashing light in response to motion of a bicycle tire.

In accordance with an embodiment of the present invention, the inventive safety light for a bicycle comprises a housing member, a power source, at least one light source supported by the housing member and electrically connectable to the power source, and motion switching means electrically connected between the power source and the at least one light source for switching the at least one light source on and off in response to motion of the housing member. In one embodiment, the switching means comprises at least one electrical contact and a pivotally supported member disposable in a first position not in contact with the at least one electrical contact and disposable at a second position in contact with the electrical contact depending on the motion of the housing member. The pivotally supported member pivots so that the motion of the housing member causes the at least one light source to switch on and off. In another embodiment, the switching means comprises at least one electrical contact and a resilient member mounted at one end. The resilient member is disposable in a first position not in contact with the at least one electrical contact and disposable at a second position in contact with the electrical contact depending on the motion of the housing member. The resilient member flexes in response to motion so that the motion of tile housing member causes the at least one light source to switch on and off. A weight member may be attached at one end of the resilient member to provide a source of momentum to cause the resilient member to flex in response to motion.

The housing member preferably comprises a first half shell engageable with a second half shell for forming in an engaged position, a hollow interior therebetween An O ring sealing member is disposed between engaging surfaces of the first half shell and second half shell to provide a water tight seal and thus prevent contamination of the interior by moisture and foreign particles.

The housing member may also comprise a first half shell having an observable surface and engageable with a second half shell having an observable surface for forming in an engaged position a hollow interior therebetween. The light source may comprise a first light source (such as an LED) positioned in the interior so that an emanating first light is visible through the observable surface of the first half shell, and a second light source positioned in the interior so that an emanating second light is visible through the observable surface of the second half shell. Mounting means mounts the housing member on spokes of a bicycle tire so that relative to a longitudinal axis of the bicycle tire, the first light is visible when viewing one side of the tire and the second light is visible when viewing an other side of tile tire. Stated otherwise, in accordance with the present invention, a flashing light is oriented so that the light is directed toward the sides (perpendicular to the longitudinal axis of the tire), so that it is visible by a viewer at a position along the side of the bicycle.

The observable surface of the first half shell and the second half shell is a reflecting surface for reflecting light emanating from the exterior of the housing member (such as a car head light). A magnifying surface disposed in front of each light source magnifies the emanating light.

In some embodiments of the present invention, the power source comprises a battery. In this case, the housing member comprises a first half shell engageable with a second half shell for forming, in an engaged position, a hollow interior therebetween. Joining means disengageably joins the first half shell and the second half shell. A battery holder is, supported in the interior, and is accessible when the first half shell is disengaged from the second half shell for replaceably holding the battery. A thin disposable battery (such as the type used in wrist watches) can be used as the power source. Thus, when the battery has been drained, it can be easily replaced.

In still another embodiment of the switching means, at least two electrical contacts are provided. A moving member (such as a ball bearing) is disposable between a first position not in contact with at least two of the electrical contacts and a second position in contact with at least two of the electrical contacts depending on the motion of the housing member. Thus, due to the moving ball bearing, the motion of the housing member causes the at least one light source to switch on and off. Attaching means (such as a clamp, retaining bumps, etc.) is provided for attaching the safety light to the spokes of a bicycle.

In a preferred embodiment, the switching means further comprises a control circuit having flashing means (such as a timing circuit) for producing a flashing voltage pulse effective to cause the at least one light source to flash on and off. The control circuit further comprises timing means for detecting an on-off cycle each time the switching means switches the at least one light source on and off in response to motion of the housing member, and for controlling the flashing means to produce the flashing voltage pulse for a predetermined length of time after detecting a last on-off cycle.

In another embodiment of the inventive bicycle safety light, a selfgenerating power source is supported by the housing member. In this embodiment, the power source comprises a magnetic member for providing a magnetic field. A conductive coil is disposed relative to the magnetic member so that motion of the magnetic member relative to the conductive coil, in response to motion of the housing member, produces an electric current. Each light source supported by the housing member is electrically connectable to the power source for receiving the electric current generated in response to motion of the housing member. The conductive coil is a hollow cylindrical coil and the magnetic member is disposed inside the hollow cylindrical structure. Spring members are disposed at each end of the hollow cylindrical coil for storing and releasing momentum of the moving magnetic member.

In another embodiment, the conductive coil is a cylindrical coil, and the magnetic member has a through-hole for receiving the cylindrical coil. In still another embodiment, the power source further comprises a second conductive coil having a hollow cylindrical shape, the magnetic member being disposed inside the second conductive.

A self-lubricating coating may be disposed on either the surface of the conductive coil and the surface of the magnetic member. The self-lubricating coil comprises a lubricating material phase encased in a supportive matrix. Thus, the magnetic member slides relative to the coil on a friction reducing surface.

In another embodiment of tile self-generating energy source, a piezo-electric generating power source is used. In this case, a weight contained within a tube slides back and force due to the cycloid motion of the inventive bicycle safety light mounted on tile spokes of a rotating bicycle tire. At each end of the tube is a piezo-electric element which produces an electric current each time the weight bangs into it. The electric current is used to provide a power source to light LED light sources.

DETAILED DESCRIPTION OF THE DRAWINGS

Figure 1A:
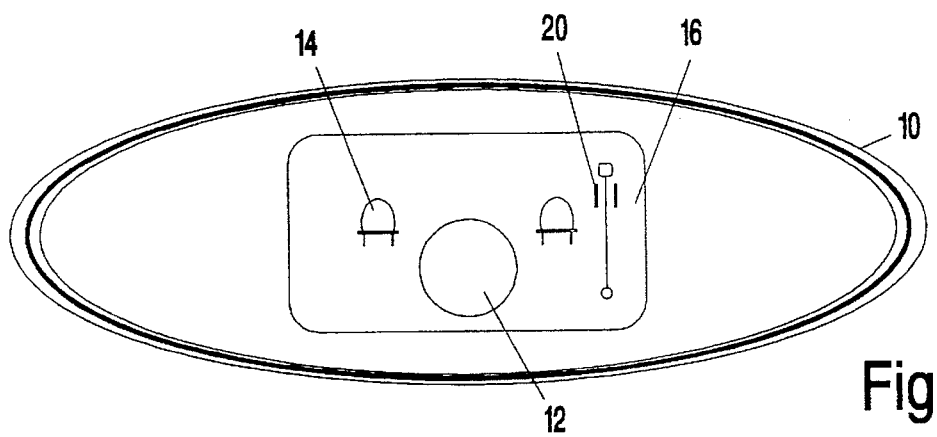
FIG. 1(a) is a schematic representation of the inventive bicycle safety light, showing the switching means in the "off", or "open condition", position.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Referring to FIGS. 1(a) through 1(c) and FIG. 10(a), the inventive bicycle safety light includes a housing member 10. A power source 12, at least one light source 14 and switching means 16 are supported in the housing member 10. Further, a control circuit 18 is also supported, in the housing member 10. In a preferred embodiment, each of the components mounted within the housing member 10 are provided on a printed circuit board. Thus, the housing member 10, which in the preferred embodiment is comprised of two half shells, can be easily fabricated using an injection mold process. The half shells of the housing member 10 may also be fabricated by other processes, such as vacuum forming, stamping, and the like. Preferably, the housing member 10 is constructed from a suitable plastic material, such as polystyrene, acrylic, and the like. In accordance with the preferred embodiment of the invention, polycarbonate plastic is used to form the housing member 10 by injection molding. Thus, the present invention takes advantage of polycarbonate's superior strength and optical properties.

At least one light source 14 is supported by the housing member 10 and is electrically connectable to the power source 12. In this embodiment, motion switching means 16 is electrically connected between the power source 12 and the light source 14, and switches the light source 14 on and off in response to motion of the housing member 10.

Figure 4:
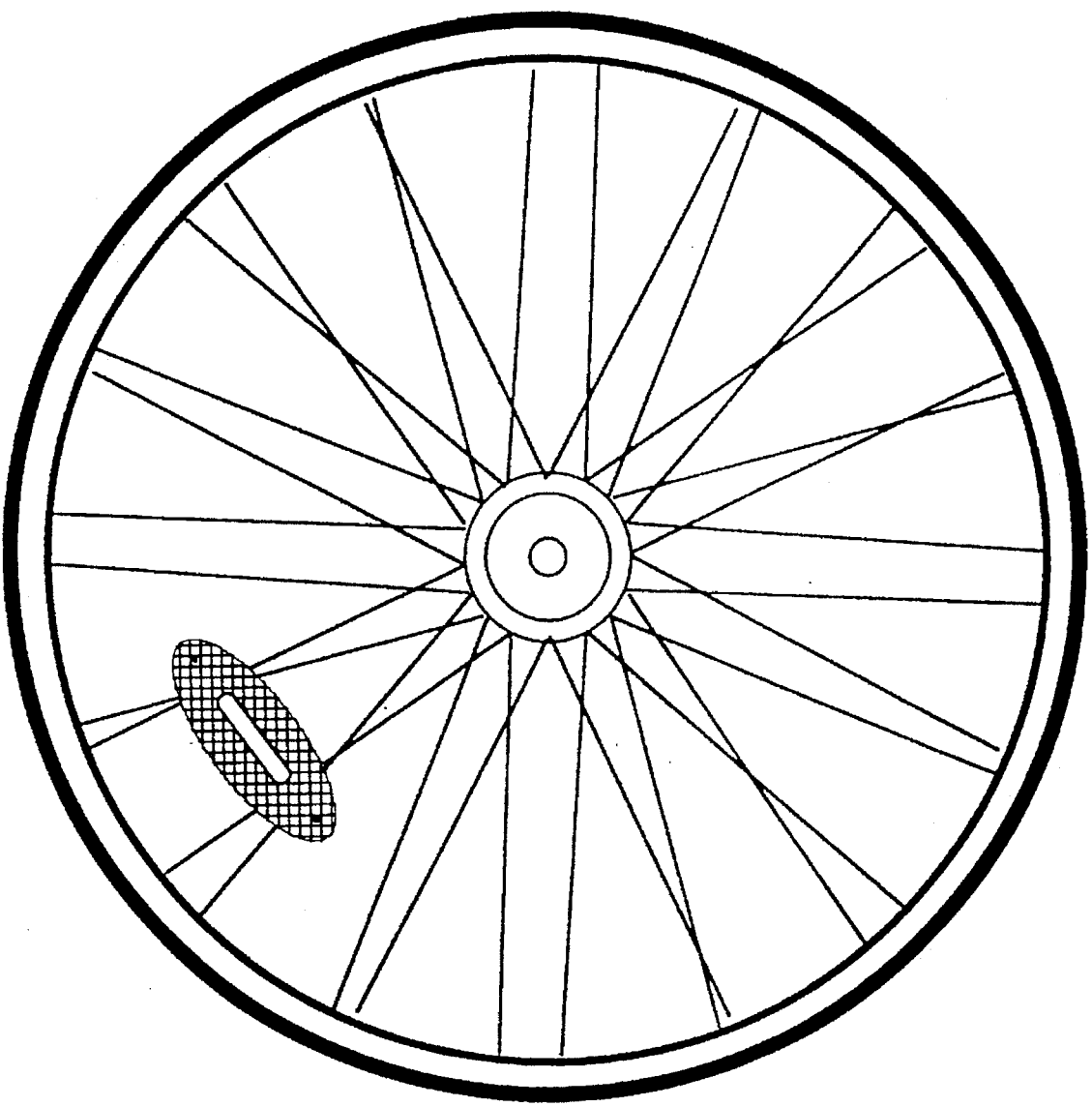
FIG. 4 is a drawing illustrating the inventive bicycle safety light mounted on the spokes of a bicycle wheel.
Figure 13:
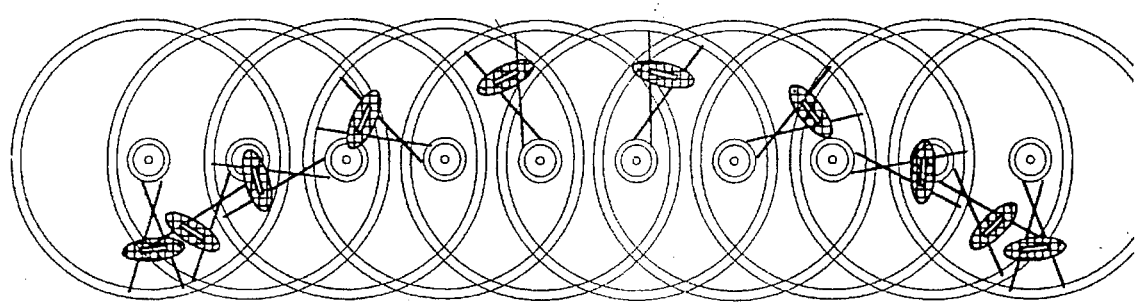
FIG. 13 is a time series representation of the inventive bicycle safety light mounted on a moving bicycle tire.

As shown in FIG. 4, the inventive bicycle safety light is mounted on the spokes of a bicycle tire. As shown in FIG. 13, as the bicycle moves forward, the inventive bicycle safety light undergoes motion having horizontal and vertical components (shown in FIG. 14). This motion of the housing member 10, as well as other motions resulting from, for example, turning bumps in the road, etc. causes the switching means 16 to activate the control circuit, which controls the power received from the power source 12, which causes the light source 14 to flash on and off.

Figure 1B:
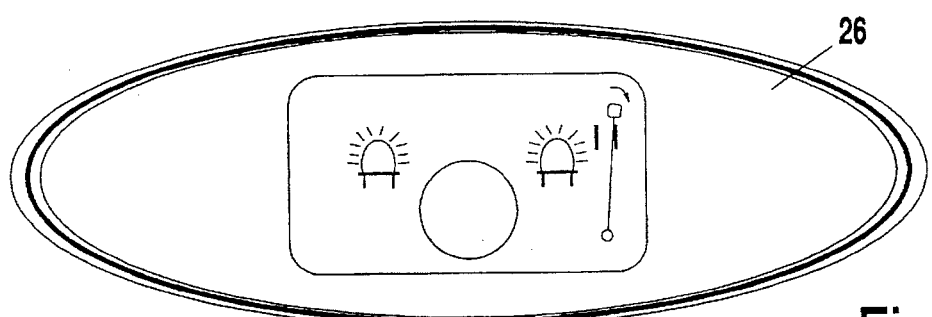
FIG. 1(b) is a schematic representation of the inventive bicycle safety light, showing the switching means in the "on", or "closed condition", position.
Figure 1C:
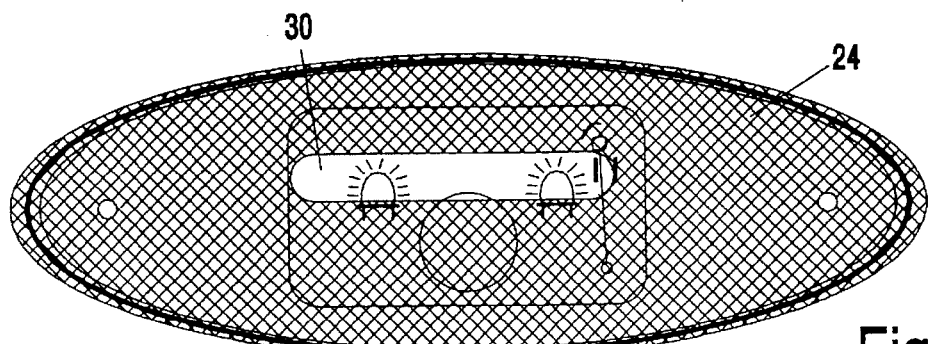
FIG. 1(c) is a schematic representation of the inventive bicycle safety light, showing a reflective and the magnifying top lens.

In the embodiment shown in FIGS. 1(a) through 1(c), the switching means 16 comprises at least one electrical contact 20 and a pivotally supported member 22. The pivotally supported member 22 is disposable in a first position (shown in FIG. 1(a)) where it is not in contact with an electrical contact 20. The pivotally supported member 22 is also disposable at a second position (shown in FIGS. 1(b) and 1(c)), at which it is in contact with an electrical contact 20. The position of the pivotally supported member 22 depends on the motion of the housing member 10, so that the motion of the housing member 10 causes the light source 14 to switch on and off (or, activates the control circuit 18, shown in FIG. 10(a), which controls the flashing of the light sources 12). The control circuit 18 (shown in FIG. 10(a)), may be used to control the "on" "off" switching of the light source 14, to provide various effects.

Figure 2A:
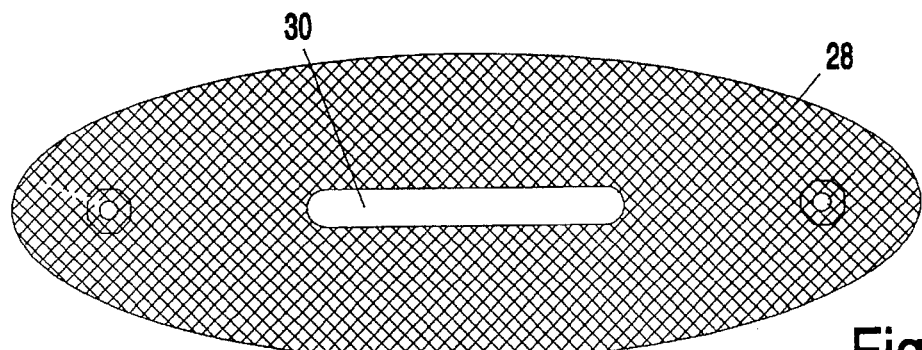
FIG. 2(a) is a top plan view of a top lens of an embodiment of the inventive bicycle safety light.
Figure 2B:
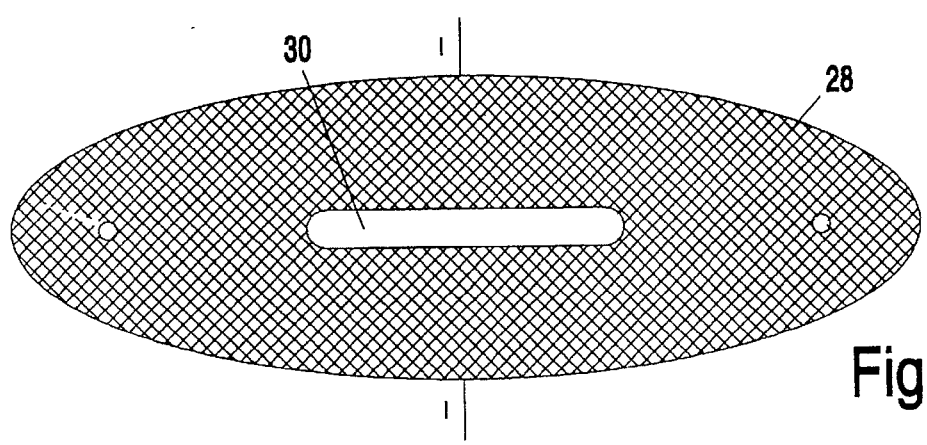
FIG. 2(b) is a top plan view of a bottom lens of the inventive bicycle safety light.
Figure 2C:
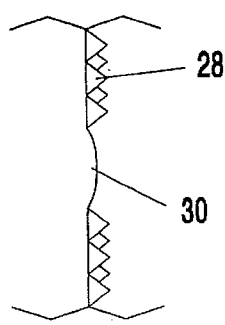
FIG. 2(c) is a cut-away cross-sectional view along lines I—I of the lens shown in FIG. 2(b)

As shown in FIGS. 2(a) through 2(c), each half shell of the housing member 10 may be comprised of a respective top lens 24 and bottom lens 26. Each lens 24,26 has an observable surface and is engageable with the other lens 24,26 for forming, in an engaged position, a hollow interior therebetween. A first light source 14 can be positioned in the interior so that light emanating from it is visible through the observable surface of the first half shell and is directed toward the side, when mounted on the bicycle tire. A second light source 14 can be positioned in the interior so that a light emanating from it is visible through the observable surface of the second half shell and is directed toward the other side, when mounted on the bicycle tire. Stated otherwise, the housing member 10 can be mounted on the spokes of the bicycle (as shown in FIG. 4) so that relative to a longitudinal axis of the bicycle tire, the first light is visible when viewing on one side of the tire and the second light is visible when viewing on the other side of the tire. Thus, in accordance with the inventive bicycle safety light, a flashing light is visible when the bicycle is viewed from either side.

The observable surface of the lens 24,26 can have a reflecting surface 28 (shown in cross section in FIG. 2(c)) for reflecting light emanating from at source located at the exterior of the housing member 10 (such as a car headlight). Stated otherwise, light from, for example, the headlights of an oncoming car, are reflected from the reflecting surface 28 of the observable surfaces of the housing member 10, making the inventive bicycle light, and thus the bicycle rider more visible. Further, the observable surface may include a magnifying surface 30 disposed in front of each light source 14, for magnifying the light emanating therefrom.

Figure 3A:
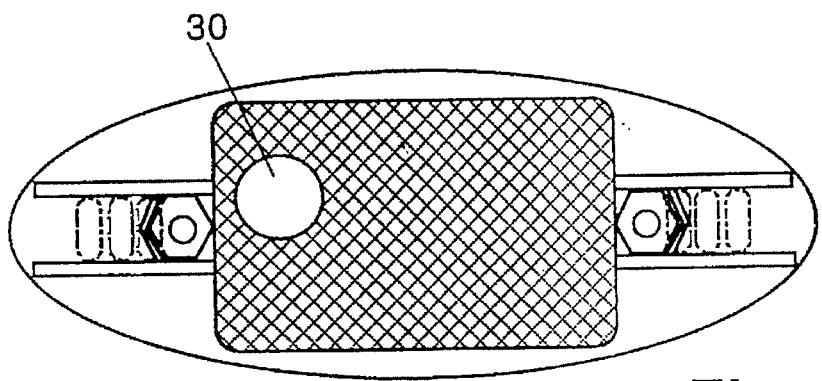
FIG. 3(a) is a top plan view of another embodiment of a lens cover of the inventive bicycle safety light.
Figure 3B:
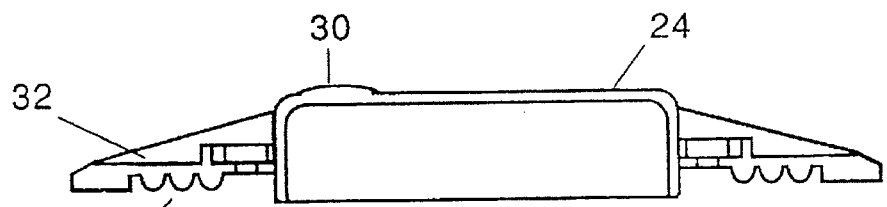
FIG. 3(b) is a cross-sectional side view of the top lens shown in FIG. 3(b)
Figure 3C:
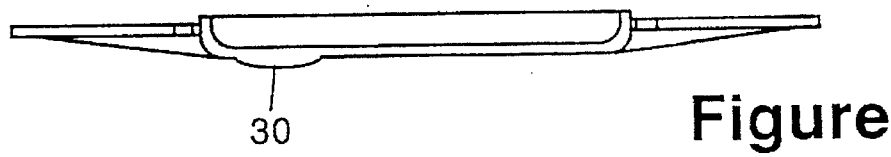
FIG. 3(c) is a cross-sectional view of a bottom lens of the embodiment shown in FIG. 3(a)

Another embodiment of the housing member 10 of the inventive bicycle safety light is shown in FIGS. 3(a) through 3(c). Attaching means 32 are provided for attaching the safety light to the spokes of a bicycle (as shown in FIG. 4). In this embodiment, a first half shell of the housing member 10 includes spoke retaining bumps 34 for engaging with and attaching the inventive bicycle safety light to the spokes of the bicycle tire. One half shell, such as the top lens 24, has a deep interior section in which is mounted the various electrical components of the bicycle safety light. The other half shell, such as the bottom lens 26, has a shallow or no interior section. Thus, when joined together the housing member 10 has a thin aerodynamic shape.

Figure 5A:
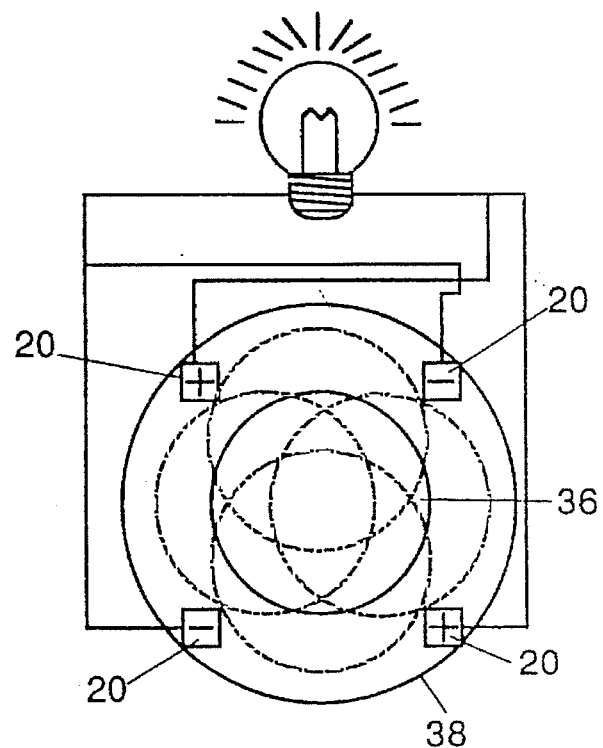
FIG. 5(a) is a schematic representation of an alternative embodiment of the switching means.

FIG. 5(a) shows an embodiment of the switching means 16 in which four electrical contacts 20 are disposed around and enclose a moving member 36 (ball bearing). The moving member 36 is disposable between a first position where it is not in contact with at least two of the electrical contacts 20, and a second position in contact with at least two of the electrical contacts 20. The position of the moving member 36 depends on the motion of the housing member 10, so that the motion of the housing member 10 causes the light source 14 to switch on and off (or, upon contact of the moving member 36 with at least two electrical contacts 20, the control circuit 18 is activated). Stated otherwise, as shown in FIG. 5(a), when the ball bearing moving member 36 is disposed at a position shown by the solid-line ball bearing 36, there is no closed circuit between any of the electrical contacts 20, and thus the light source 14 is off (or an "open condition" occurs). However, due to the motion of the housing member 10 the ball bearing, moves into contact with two of the electrical contacts 20, the circuit is complete and the light source 14 lights (or the control circuit 18 is activated due to the on-off cycling between the "open condition" and the "closed condition". A cap member 38 encloses the electrical contacts 20 and ball bearing 36, but may not be necessary if the electrical contacts 20 are shaped to form a cage around the ball bearing 36. FIG. 5(a) is a top plan view of this embodiment of the switching means 16, and in a side view (not shown) the electrical contacts 20 have the shape of posts extending from the surface of, for example a printed circuit board. Thus, as the motion of the housing member 10 causes the moving member 36 (i.e. ball bearing) to move around, the light source 14 switches on and off and effectively acts as a highly visible warning device to protect the rider of the bicycle to which the safety light is mounted.

Alternatively, as the motion of the housing member 10 causes the moving member 36 (i.e. ball bearing) to move around, the control circuit 18 is activated which controls the flashing of the light depending on the attributes of the control circuit. An embodiment of the control circuit 18 is described in detail below with reference to FIGS. 17(a) and 17(b).

Figure 5B:
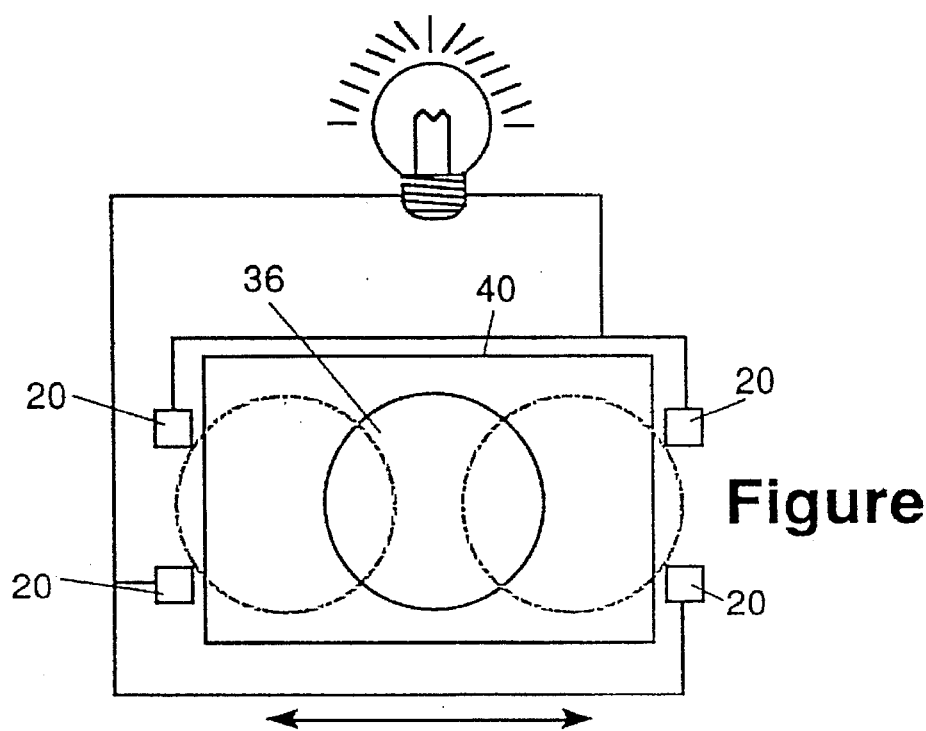
FIG. 5(b) is a schematic representation of another alternative embodiment of the switching means.

As shown in FIG. 5(b), in another embodiment of the switching means 16, the ball bearing moving member 36 is disposed within a tube, and the tube 40 has either of its ends open. Electrical contacts 20 disposed at the open ends of the tube 40 switch the light source 14 on and off (or causes the on-off cycling), depending on the position of the ball bearing 36. Thus, as shown, when the ball bearing 36 is at the solid line position, the circuit is open and the light source 14 is off. However, when the ball bearing 36 moves to either of the dash line positions, the contacts 20 and ball bearing 36 provide a completed circuit, and thus the light source 14 is turned on (or the control circuit 18 activated).

Figure 6A:
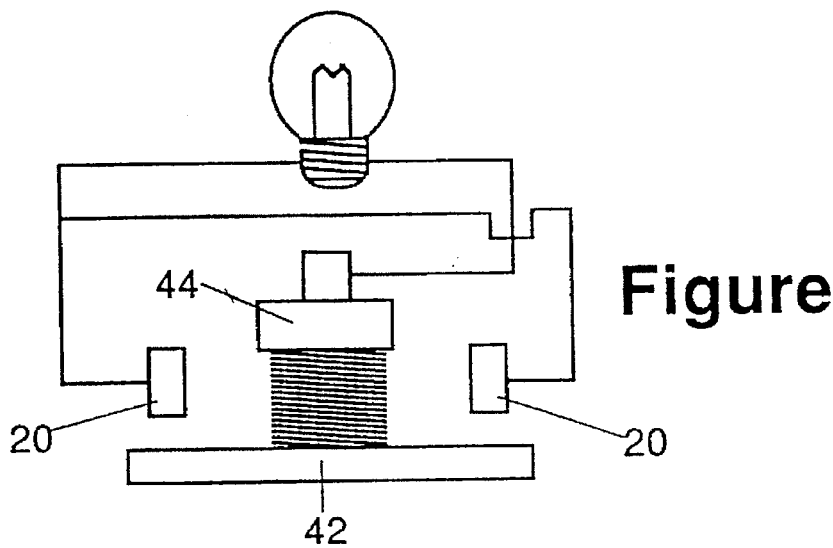
FIG. 6(a) is a schematic representation of yet another alternative embodiment of the switching means.
Figure 6B:
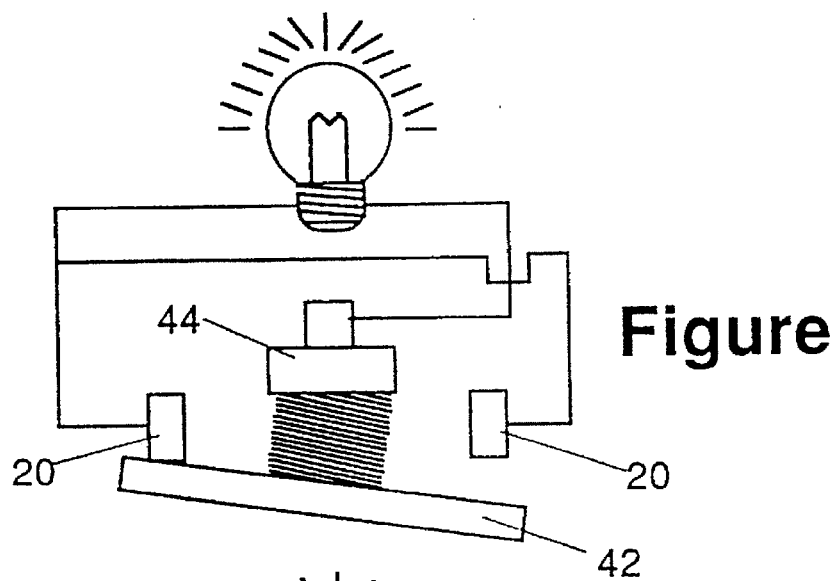
FIG. 6(b) is a schematic representation of the switching means shown in FIG. 6(a) shown in the "on", or "closed condition", position.
Figure 6C:
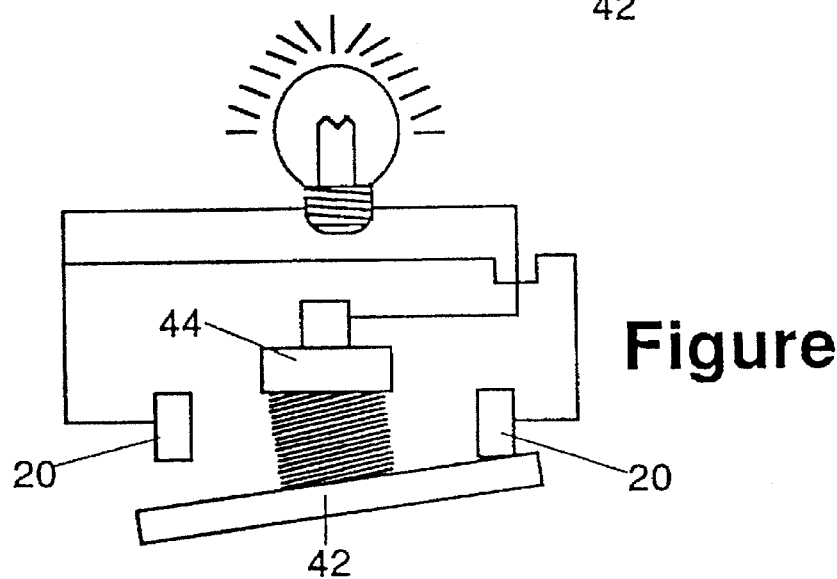
FIG. 6(c) is a schematic representation of a switching means shown in FIG. 6(a) shown the "off", or "open condition", position.

FIG. 6(a) shows another embodiment of the switching means 16 in which a conductive member 42 is fixed to a spring element 44, and the conductive member 42 is free to move due to the motion of the housing member 10, with the spring element 44 providing a restoring force to bring the conductive member 42 into a first position shown in FIG. 6(a). As shown in FIG. 6(b), contacts 20 provided on either side of the spring element 44, the conductive member 42, and another contact 20 in electrical contact 20 with the conductive member 42, form a completed circuit when the conductive member 42 is disposed at a second position shown in FIGS. 6(b) and 6(c).

FIGS. 7(a) through 7(f) show an embodiment of the switching means 16 in which at least one electrical contact 20 is provided. A resilient member 46 is mounted at one end and disposable in a first position where it is not in contact with the electrical contact 20. The resilient member 46 is disposable at a second position (shown in FIGS. 7(b) and 7(e)), at which there is contact with the electrical contact 20. Thus, the resilient member 46 is brought into contact with the electrical contact 20 depending on the motion of the housing member 10, so that the motion of the housing member 10 causes the light source 14 to switch on and off (or activates the control circuit 18). The switching means 16 shown in this embodiment, as well as the switching means 16 shown in the other embodiments, can be printed on a printed circuit board (shown schematically in FIG. 7(c) and FIG. 7(f)). A weight is provided on the end of the resilient member 46 which is not mounted on the printed circuit board. The weight acquires a momentum due to the motion of the housing member 10, which counteracts the restoring force of the resilient member 46, to bring the resilient member 46 into contact with the electrical contact 20. The momentum of the weight is then overcome by the resilient member 46, and by further motion of the housing member 10, so that the resilient member 46 vibrates back and forth causing the light source 14 to flash on and off (or activating the control circuit 18).

Figure 7A:
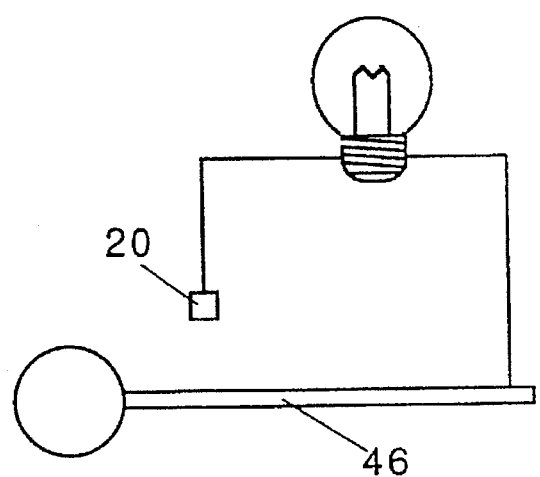
FIG. 7(a) is a top plan view of still another alternative embodiment of the switching means.
Figure 7B:
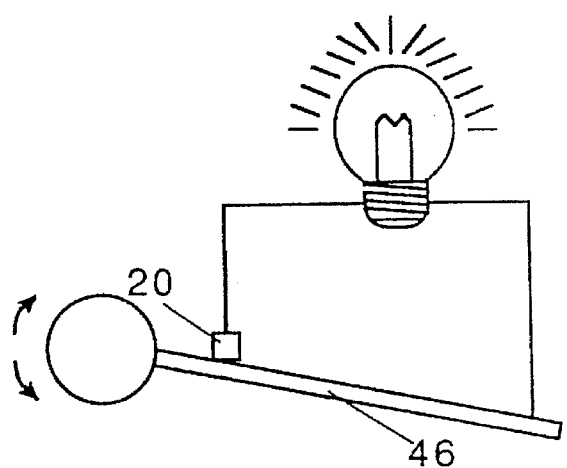
FIG. 7(b) is a top plan view of the switching means shown in FIG. 7(a) shown in the "on", or "closed condition", position.
Figure 7C:
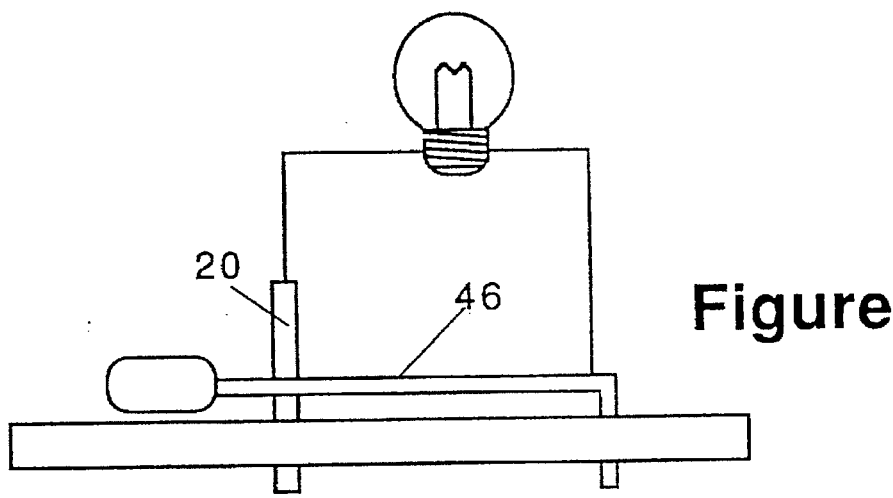
FIG. 7(c) is a side-view of the switching means shown in 7(a) mounted on a circuit board.
Figure 7D:
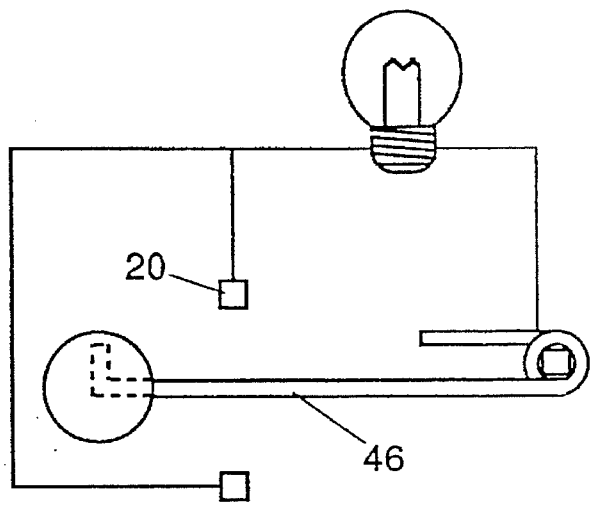
FIG. 7(d) is a top plan view of still another alternative embodiment of the switching means.
Figure 7E:
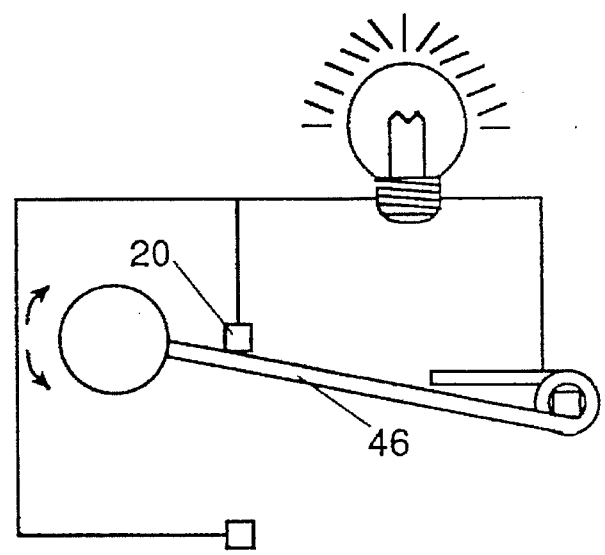
FIG. 7(e) is a top plan view of the switching means shown in FIG. 7(d) shown in the "on", or "closed condition", position.
Figure 7F:
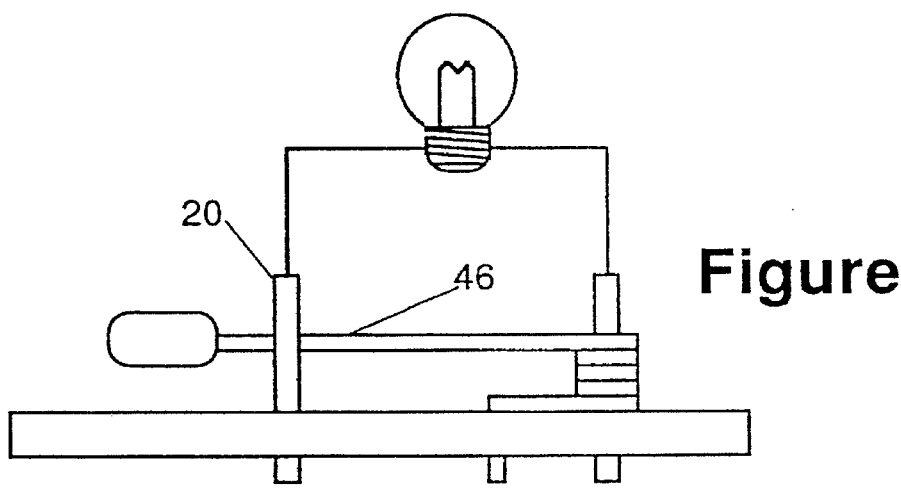
FIG. 7(f) is a side-view of the switching means shown in 7(d) mounted on a circuit board.

As shown in FIGS. 7(d) through 7(f), the resilient member 46 may be formed from, for example, a spring metal which is wound around a mounting post. The winding of the spring metal improves the attributes of the resilient member's 46 restoring source. In a preferred embodiment, the weight comprises a one half gram weight shot disposed at the end of a spring metal wire, such as music wire. An L-shaped bend in the music wire retains the lead shot on its end. The wound section of the music wire has a length of ⅛ inch above the surface of the printed circuit board. A mounting portion of the music wire extends ¼ inch from the base of the wound portion, and is mounted through the circuit board at a mounting end. The electrical contact 20 and the mounting posts each extend above the surface of the printed circuit board ¼ inch.

Figure 8A:
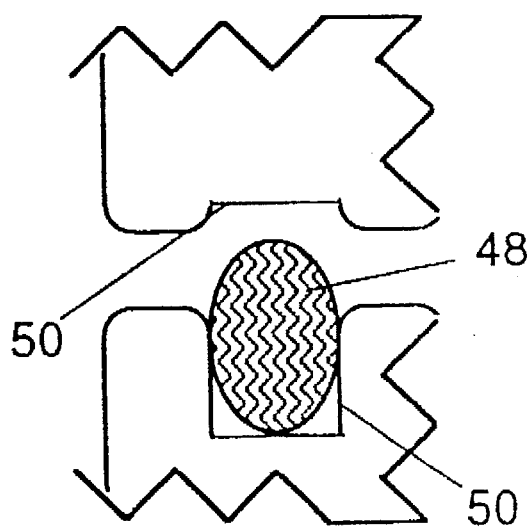
FIG. 8(a) is a cut-away cross-sectional view of an enlarged portion of the housing of the inventive bicycle safety light, showing an 0 ring sealing member in a non-sealing position.
Figure 8B:
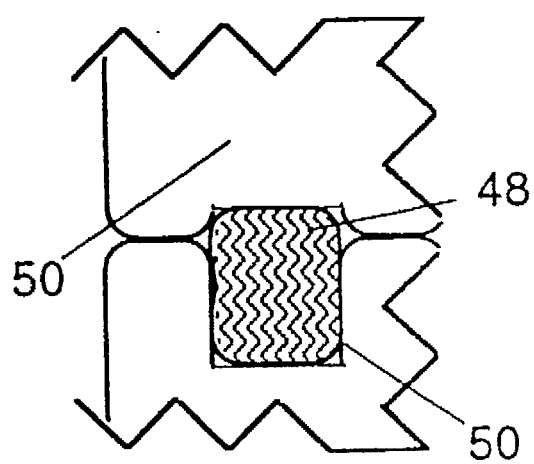
FIG. 8(b) is a cut-away cross-sectional view of the enlarged portion of the housing member shown in FIG. 8(a), showing the O ring sealing member in a sealing position.

As shown in FIGS. 8(a) and 8(b), a first half shell of the housing member 10 is engageable with a second half shell for forming in an engaged position a hollow interior therebetween. An O ring sealing member 48 is disposable between engaging surfaces 50 of the first half shell and the second half shell for preventing contamination of the interior by moisture and foreign particles. In accordance with the present invention, the first half shell and the second half shell can be separated so that the interior of the housing member 10 is accessible, for example, to replace the disposable battery. Thus, the O ring sealing member 48 is provided to insure the integrity and longevity of the electrical components and mechanical components of the inventive safety light.

Figure 9A:
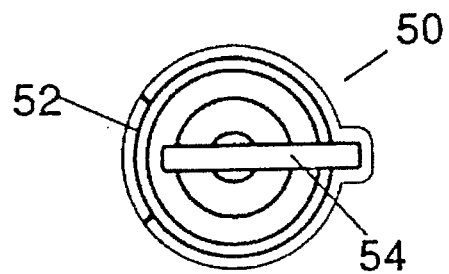
FIG. 9(a) is a top plan view of a battery holder in accordance with an embodiment of the present invention.
Figure 9B:
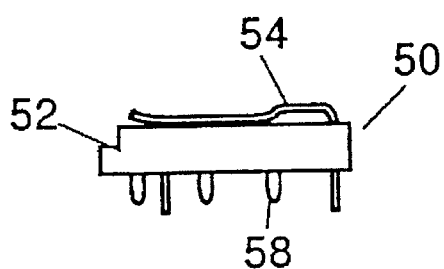
FIG. 9(b) is a side view of the battery h. older shown in FIG. 9(a)
Figure 9C:
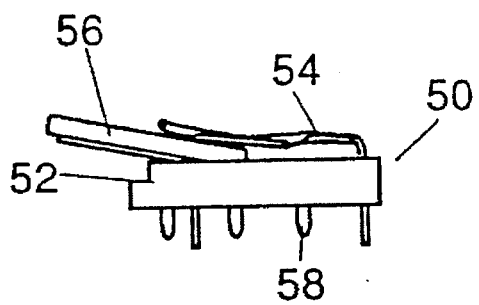
FIG. 9(c) is a side view of the battery holder shown in FIG. 9(a), showing the replacement of a replaceable battery.
Figure 9D:
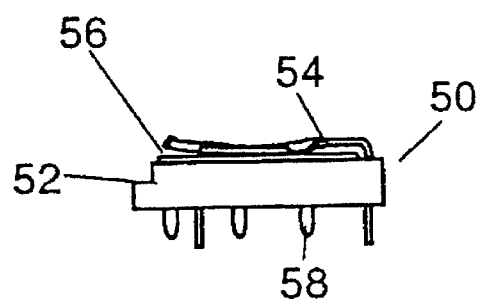
FIG. 9(d) is a side view of the battery holder shown in FIG. 9(a), shown holding a replaceable battery.

FIGS. 9(a) through 9(d) show an embodiment of an inventive battery holder 50 which allows the battery power source 12 of the inventive safety light to be easily replaced. This feature allows the useful life of the inventive safety light to be extended nearly indefinitely, simply by periodically replacing the battery power source 12. The battery holder 50 includes a holder body 52 and retaining member 54. The holder body 52 holds the replacement battery and has an electrical contact disposed on its surface which comes in contact with the replaceable battery 56. The retaining member 54 may also be an electrical contact, so that popular batteries having obverse positive side and reverse negative side configurations can be used. The holder body 52 further includes mounting posts 58 for mounting the battery holder 50 on a printed circuit board. As shown in FIG. 9(c), the replaceable battery 56 is easily removed and placed in the holder body 52 against the restoring force of the retaining member 54. FIG. 9(d) shows the inventive battery holder 50 holding a replaceable battery 56.

Figure 10A:
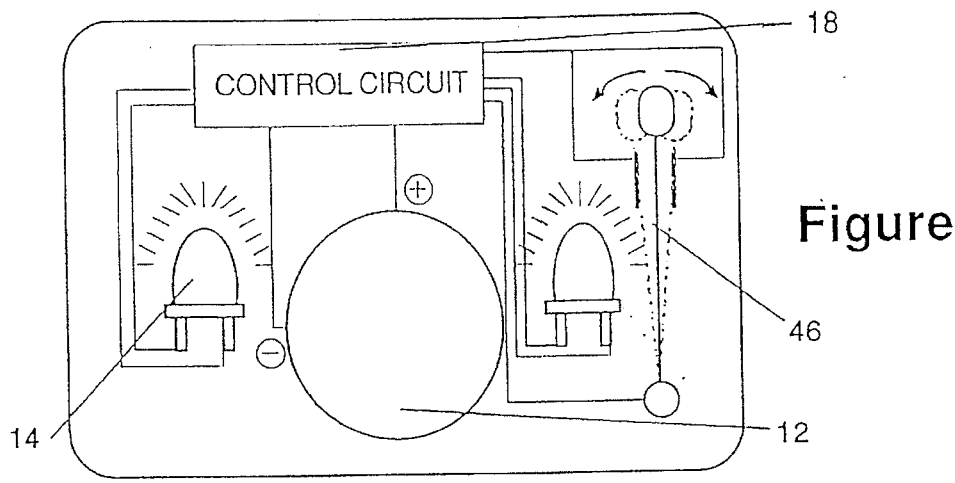
FIG. 10(a) is a schematic representation of the inventive bicycle safety light; showing a replaceable battery power source and motion sensitive switching means.
Figure 10B:
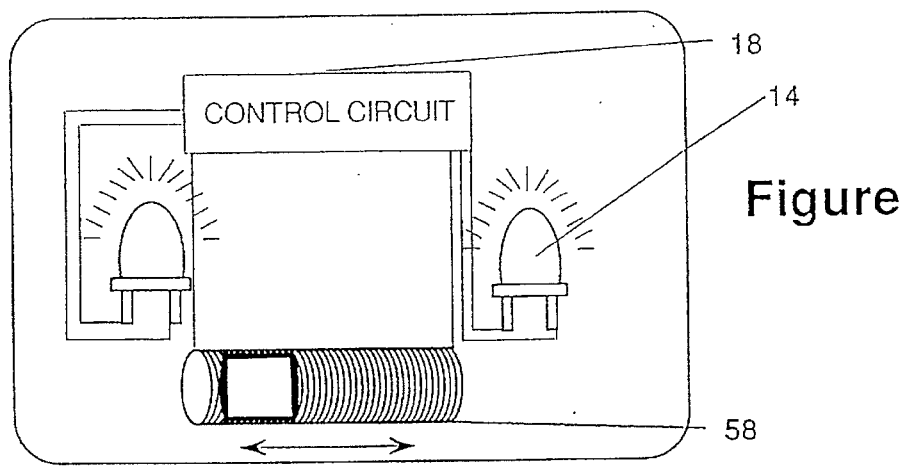
FIG. 10(b) is a schematic representation of the inventive bicycle safety light, showing an electro-magnetic energy generating power source.
Figure 10C:
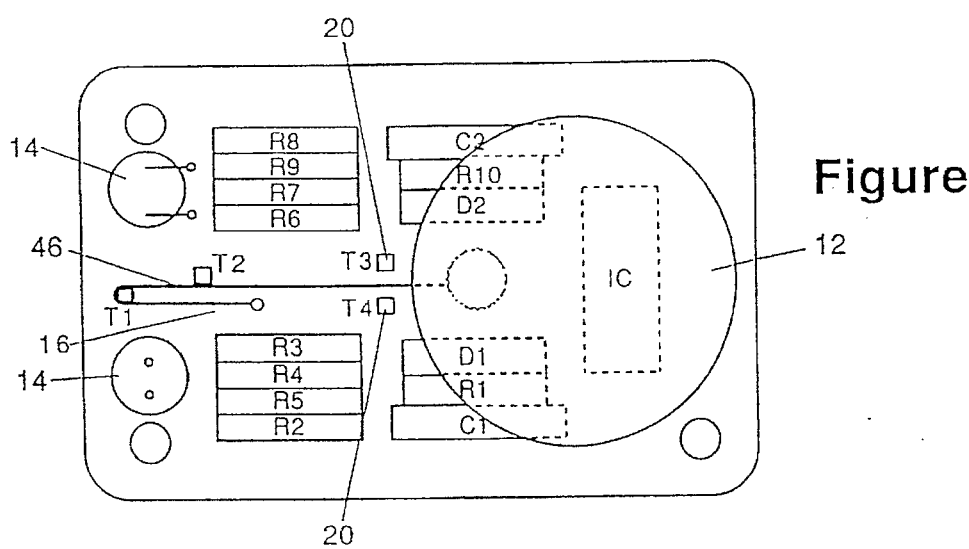
FIG. 10(c) is a schematic representation of a preferred embodiment of the inventive bicycle safety light; showing the circuit board layout, including a replaceable battery power source and motion sensitive switching means.
Figure 11A:
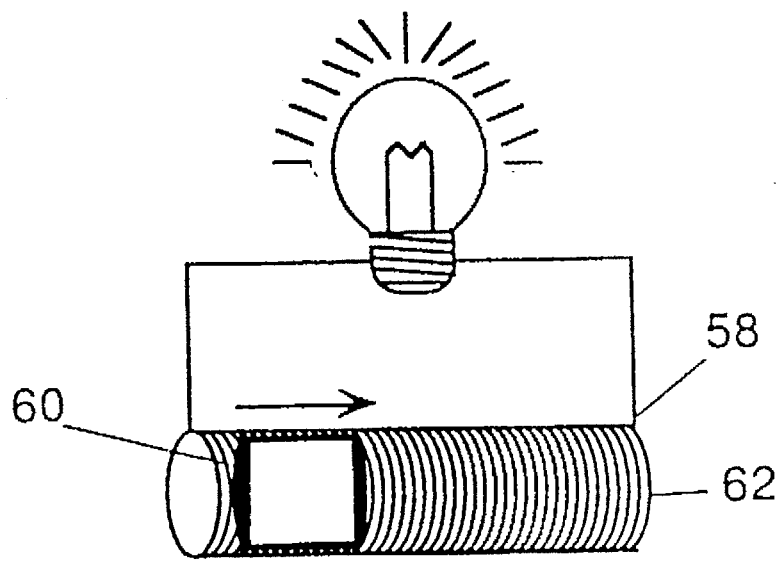
FIG. 11(a) is a schematic representation of the electro-magnetic energy generating power source.
Figure 11B:
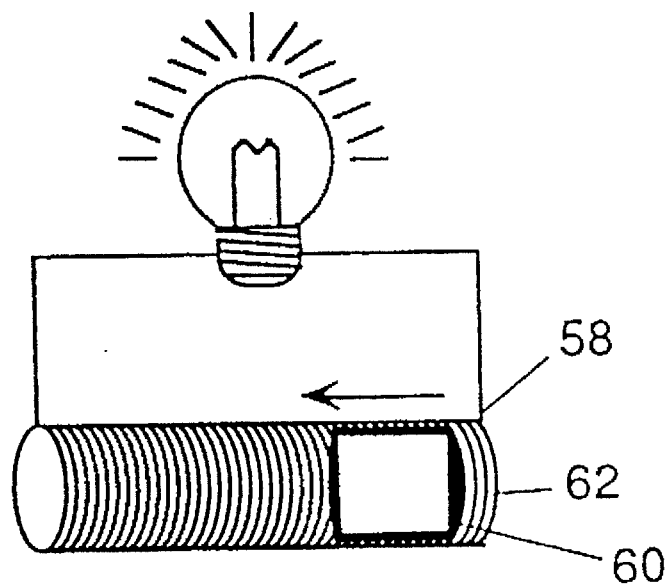
FIG. 11(b) is a schematic representation of the electro-magnetic energy generating power source.

In FIGS. 10(a), 10(b) and 10(c), three configurations of the inventive bicycle safety light are shown. In FIG. 10(a), the output of a power source 12 is controlled by a control circuit 18 which further controls the flashing of light sources 14. Switching means 16, which as shown may comprise a pivotally disposed resilient member 46 as described above, but which may also comprise other embodiments also described therein, determines the flashing of the light sources 14 directly, or activates the control circuit 18 which controls the flashing. In order to allow the bicycle safety light to flash at proper times, the switching means 16 is activated depending on motion due to the movement of the bicycle tire.

In one configuration, the light source 14 produces a flash each time the switching means 16 causes a closed circuit, so that flashing is directly dependent upon the contact between, for example, the resilient member 46 and the electrical contact 20. In another configuration, the control means controls the flashing of the light source 14, and has means to begin flashing by the light source 14 when the switching means 16 cycles between a closed circuit and an open circuit. As long as the switching means 16 continues to cause an open and closed circuit repeatedly, the control circuit 18 produces the flashing lights from the light source 14. Also, in accordance with the present invention the control circuit 18 can include means for continuing the flashing of the light sources 14 for a predetermined amount of time lifter the switching means 16 has stopped opening and closing the circuit. Thus, for example, if the bicycle rider comes to a momentary stop, such as lit a cross walk, tile switching means 16 (which depends on the motion of the bicycle tire) would stop opening and closing the circuit for the period that the bicycle tire is not in motion. However, during this period it is very important that the light sources 14 continue to flash, particularly since it is at this point in time, when the bicycle rider is about to cross traffic, that visibility is most important. Therefore, tile control circuit 18 includes means for continuing the flashing of the light sources 14 for a predetermined amount of time after motion of the bicycle tire has stopped.

FIG. 10(b) shows a configuration of the inventive bicycle safety light, in which the battery power source 12 is replaced by a self-generating power source 58. With this configuration, the switching means 16 may or may not be included, since the motion of the bicycle causes the self-generating power source 58 to generate the electricity for the flashing light sources 14 in an on-off sequential pattern. The self-generating power source 58 can be configured so that the polarity of the electricity supplied reverses with each on-off pulse generated. The control circuit 18 may include a temporary power storage device, such as a capacitor, to temporarily store energy generated by the self-generating power source 58, so that, for example, electricity is available for continuously flashing the light sources 14 even after the motion of a bicycle tire has stopped.

FIG. 10(c) shows the layout of the preferred embodiment of the inventive bicycle safety light. In this embodiment, the light sources 14 are LEDs. One of the LEDs (top light source 14) is disposed so that its light emanates in a direction into the paper. The other LED (bottom light source 14) is disposed so that its light emanates in a direction out from the paper. The switching means 16 includes a resilient member 46 (as shown in FIGS. 7(d)–7(f)) which is mounted on the printed circuit board so that it extends between two contacts 20, which are conductive posts mounted on the printed circuit board. As the inventive bicycle safety light moves (due to the motion of the bicycle tire), centrifugal force causes the resilient member 46 to come into contact with one of the contacts 20. A replaceable battery 12 is disposed over the weight end of the resilient member 46, so that movement of the switching means 16 is restrained. By disposing the battery 12 over the weight end, movement of the weight which would place the resilient member 46 at a position outside the contacts 20 (as opposed to between the contacts 20) is prevented.

Referring to FIGS. 11(a) through 12(c), the self-generating power source 58 comprises a magnetic member 60 for providing a magnetic field. A conductive coil 62 is disposed relative to the magnetic member 60 so that motion of the magnetic member 60 relative to the conductive coil 62, in response to motion of the housing member 10, produces an electric current. Stated otherwise, the power source 58 is supported by the housing member 10 (shown, for example, in FIG. 10(b)), which in turn is supported on the bicycle tire. As the bicycle tire moves, the magnetic member 60 slides back and forth within the conductive coil 62, so that the magnetic field lines of the magnetic member 60 cut across the wire coils of the conductive coil 62 and thereby induce an electric current. The light source 14 is also supported by the housing member 10, and is electrically connectable to the power source 58 for receiving the electric current in response to motion of the housing member 10. In the embodiment of the power source 58 in FIGS. 11(a) through 12(c), the conductive coil 62 is a hollow cylindrical coil, and the magnetic member 60 is disposed inside of the hollow cylindrical structure.

Figure 12A:
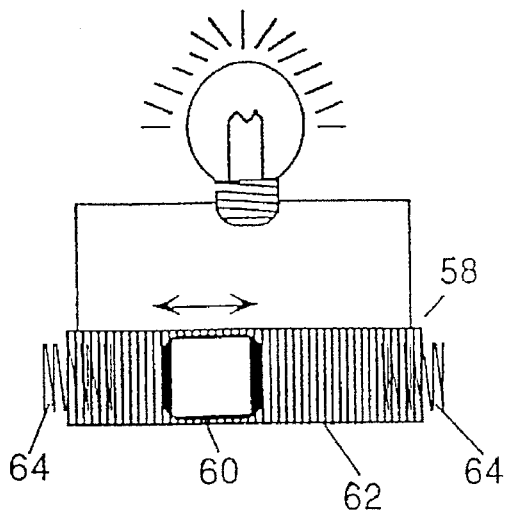
FIG. 12(a) is an isolated view of the inventive electro-magnetic energy generating power source and spring members.
Figure 12B:
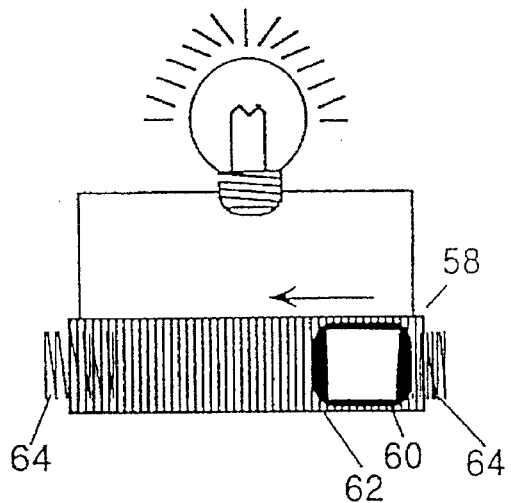
FIG. 12(b) is an isolated view of the inventive electro-magnetic energy generating power source and spring members.
Figure 12C:
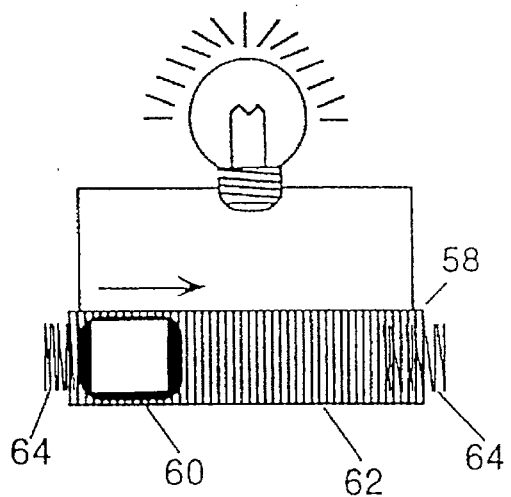
FIG. 12(c) is an isolated view of the inventive electro-magnetic energy generating power source and spring members.

As shown in FIGS. 12(a) through 12(c), spring members 64 are disposed at each end of the hollow cylindrical coil 62 for storing and releasing momentum of the moving magnetic member 60. Stated otherwise, as the moving magnetic member 60 slides within the conductive coil 62, it obtains a momentum due to the motion of the bicycle tire. When the magnetic member 60 reaches the end of the coil, it temporarily compresses the spring member 64 due to the momentum of the magnetic member 60, which is then released to give the magnetic member 60 impetus in the opposite direction.

Figure 14:
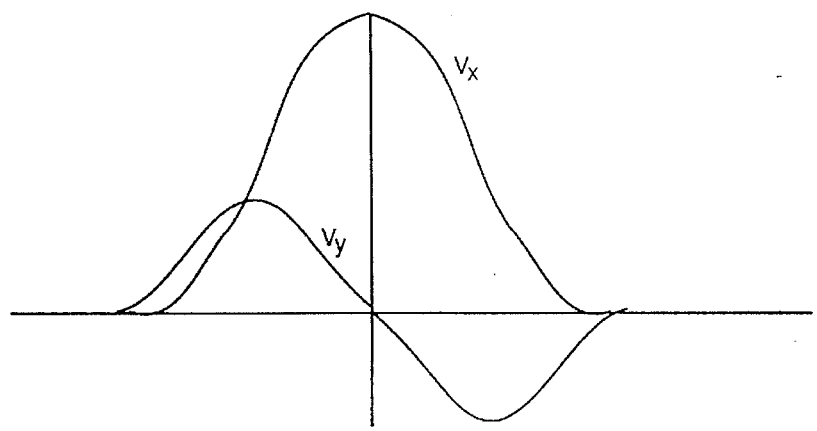
FIG. 14 is a graphic representation of the vertical and horizontal motion components of the inventive safety light mounted on a moving bicycle tire.

FIGS. 13 and 14 schematically represent the motion of the inventive bicycle safety light mounted on a moving bicycle tire. FIG. 14 is a normalized plot of the horizontal (Vx) and vertical (Vy) velocity components of the path of the inventive bicycle safety light mounted on a moving bicycle tire. These components are out of phase and the horizontal component is always positive and at one point is zero. As shown in FIG. 13, tile traveling point always makes one rotation for every revolution of the bicycle tire. Since the motion of the moving bicycle tire is both rotational and linear, as illustrated in FIG. 13. a cycloid curve is generated which describes the motion of tile inventive safety light. In accordance with the present invention. energy is extracted from the acceleration forces (Vx and Vy) that produce the changes in velocity. The maximum acceleration points in the vertical direction are at the start, mid, and end of tile revolution of the bicycle tire. The maximum acceleration in the horizontal direction is at the 1¼ and 3¼ rotational point. In the radial direction (out from the center) of the wheel, the acceleration force is constant (i.e. non-oscillatory). However, in the tangential direction, tile acceleration force causes changes in accelerations of the moving magnetic member 60 within tile conductive coil 62, which are used to generate electricity.

Figure 15A:
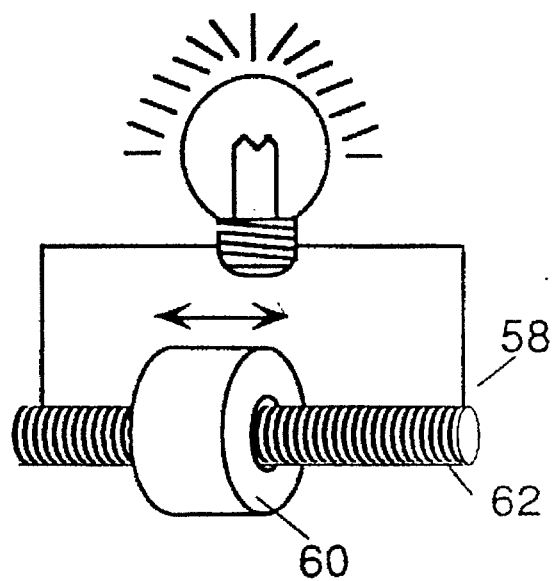
FIG. 15(a) is an isolated view of another embodiment of the inventive electro-magnetic energy generating power source.
Figure 15B:
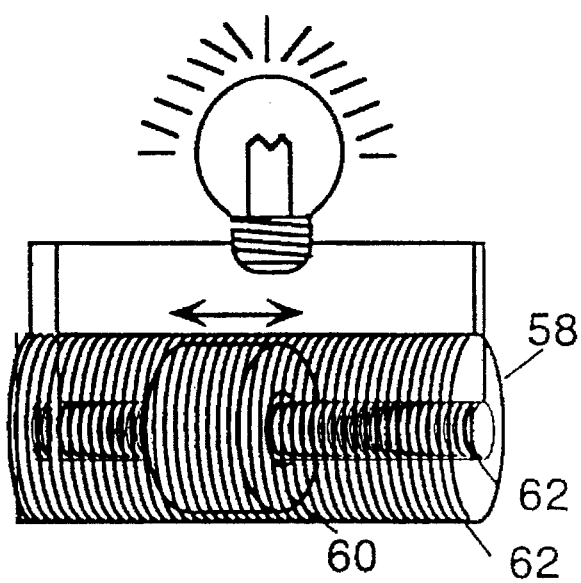
FIG. 15(b) is another alternative embodiment of the inventive electro-magnetic energy generating power source.

FIGS. 15(a) and 15(b) show an alternate configuration of the inventive self-generating power source 58, in which the conductive coil 62 is a cylindrical coil, and the magnetic member 60 has a through-hole for receiving the cylindrical coil. Then, as with tile other embodiments, tile motion of tile sliding magnetic member 60 relative to tile conductive coil 62 induces an electric current in the coil. It is also contemplated, that the magnetic member 60 may be stationary and the conductive coil 62 made to oscillate back and forth.

FIG. 15(b) shows another configuration of the inventive self-generating power source 58. In this configuration the power source further comprises a second conductive coil 62 which has a hollow cylindrical shape. The magnetic member 60 is disposed inside the second conductive coil 62. In this case, the electricity generated by the moving magnetic member 60 induced in one coil increases the magnetic field of the magnetic member 60, and thus induces a greater current in the second coil.

Figure 16A:
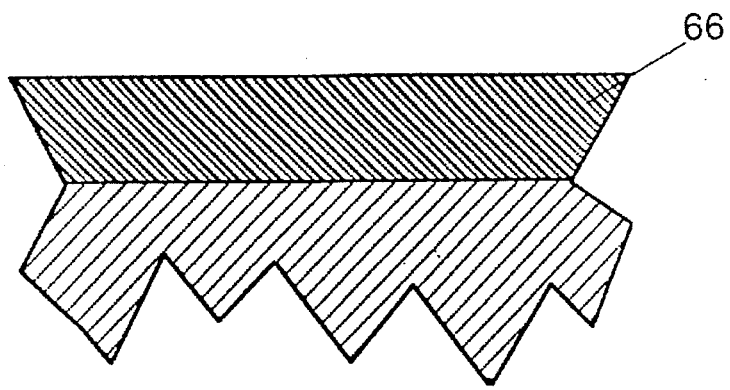
FIG. 16(a) is a cut-away cross-sectional view of an enlarged portion of the surface of either of the conductive coil or magnetic member showing a self-lubricating coating.
Figure 16B:
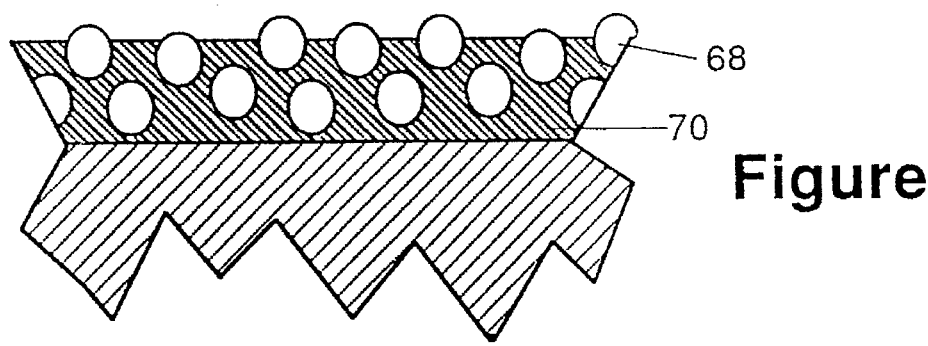
FIG. 16(b) is a cut-away cross-sectional view of the enlarged portion shown in FIG. 16(a), in which the self-lubricating coating includes a lubricating internal phase.
Figure 16C:
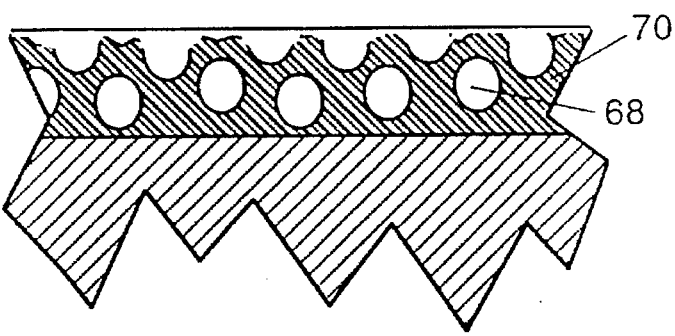
FIG. 16(c) is a cut-away cross-sectional view of the enlarged portion shown in FIG. 16(b), showing the lubricating internal phase wear.

FIGS. 16(a) through 16(c) are enlarged cross-sectional views of an inventive coating 66 which may be disposed over the magnetic member 60, or coated on the surfaces of the conductive coil 62 to reduce the effects of friction. The self-lubricating coating 66 comprises a lubricating internal phase 68 encased in a supportive matrix 70. As the self-lubricating coating 66 wears, the lubricating internal phase 68 is released from the supportive matrix 70 and forms a lubricating surface over the exposed surface of the self-lubricating coating 66. For example, the lubricating internal phase 68 may be made of Teflon, or other slippery material, encapsulated in a supportive matrix 70 such as, epoxy. Thus, as the magnetic member 60 slides relative to the conductive coil 62, frictional wear causes the lubricating internal phase 68 to develop a self-lubricating surface to thereby reduce friction.

Figure 17A:
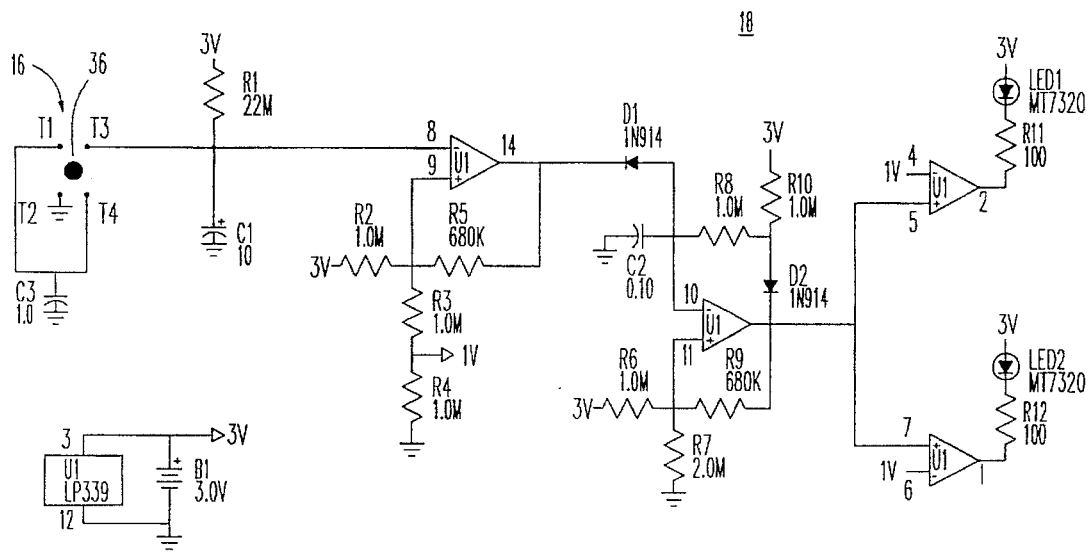
FIG. 17(a) is a schematic diagram of a construction of a control circuit using a moving member switching means in accordance with the present invention.
Figure 17B:
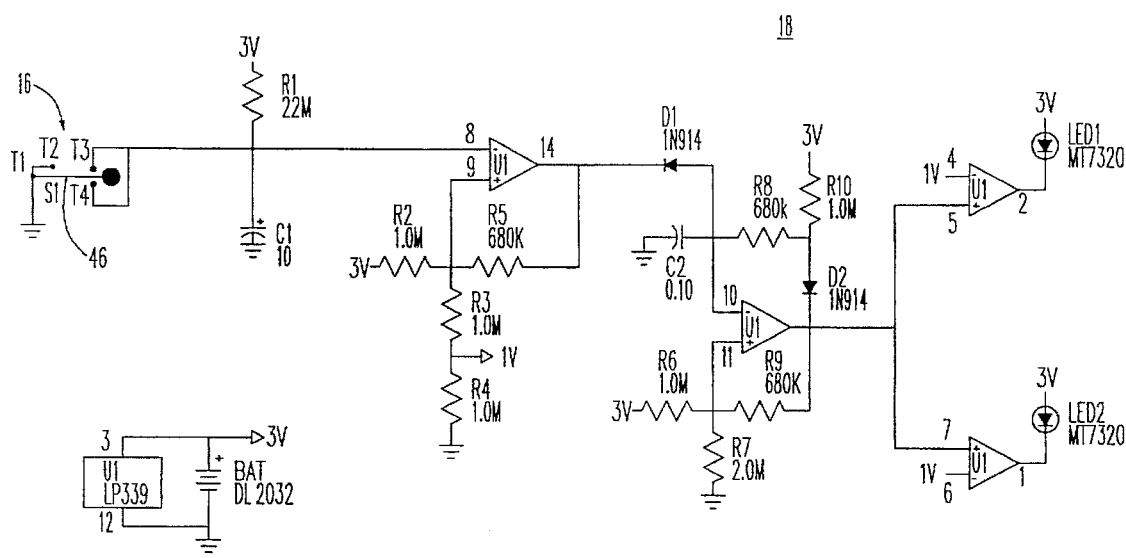
FIG. 17(b) is a schematic diagram of a construction of a preferred embodiment of the control circuit using a resilient member switching means in accordance with the present invention.

FIG. 17(a) shows an embodiment of a control circuit 18 that uses a moving member 36 switching means 16. FIG. 17(b) shows a preferred embodiment of the control circuit 18 that uses a resilient member 46 or leaf spring, as switching means 16. Referring now to FIGS. 10(c) and 17(b), in accordance with a preferred embodiment of the present invention, an integrated circuit IC and other circuit components, are mounted (along with switching means, light sources and a battery), on a printed circuit board. The integrated circuit IC is an "ultra-low power" quad comparator, such as that manufactured by National Semiconductor and Texas Instruments. The integrated circuit IC has tile advantageous features of low power supply drain (typically 60 uA), single supply voltage operation (2 V–32 V), low input bias current (typically 2.5 nA), and high output sink current (min. 15 mA@2 V).

In accordance with the preferred embodiment, the inventive bicycle safety light continues to flash for a predetermined period of time after the bicycle tire stops rotating (for example, when the cyclist temporarily stops at a cross walk). Thus, the flashing lights (LED light sources 14) continue to provide visibility for a period of time after the bicycle has stopped (or when the centrifugal force is too low to effect switching of the switching means and cause tile light sources to flash, such as when the bicycle is being slowly walked). To accomplish the continued flashing effect, a comparator #3 (UI-8, 9 and 14) and its associated components (RI-5, C1, TI-3, S1 and D1) implement the centrifugal turn-on and turn-off delay function. A comparator #4 (U1-10, 11 and 13) and its associated components (R6-10, C2 and D2) implement the flashing function of the light sources. A comparator #1 (UI-4, 5 and 2) and a comparator #2 (U1-6, 7 and 1) are used as buffers for the LED light sources.

In the idle state, the resilient member 46 does not contact either electrical contact 20 (shown in FIG. 17(b) as S1 not touching T3 or T4). When S1 does not touch T3 or T4 for a predetermined amount of time (in the preferred embodiment, for about 2 minutes), capacitor C1 is fully charged to +3 volts. Capacitor C2 is clamped to ground via diode D1 and comparator #3's output pin (UI-14), which is sinked to ground. Comparator #4's (open collector) output pin (U113) is pulled to 2 V by the resistor divider R6-7. Comparator #1 and #2's output pins (U1-2 and U 1-1) are floating high. In this state, the LED light sources are not flashing.

Applying a centrifugal force to the switching means 16, causes switch S1 (resilient member 46 shown in FIG. 10(c)) to short terminal post T3 or T4 (contact 20) to ground (negative battery) via terminal posts T1 and T2. Shorting T3 discharges capacitor C1 and causes the voltage on pin 8 of comparator #3 to drop below the threshold voltage on pin 9 (which is approximately 1 volt in the idle state). Comparator #3 will release its sink on output pin 14. The voltage at pins 9 and 14 will rise immediately to approximately 2 volts. The diode clamp D1 is removed from the flasher capacitor C2 and flashing of the LED light sources begins.

In the flash OFF state, the voltage on C2 will rise to 3 V through resistors R8 and R10. When the voltage on pin 10 reaches the threshold of pin 11 (which is approximately 2 volts), comparator #4 will switch to the flash ON state. In the flash ON state, comparator #4's output pin 13 is sinked to ground. Capacitor C2 is being discharged to ground through resistor R8 and diode D2. When the voltage on pin 10 reaches the threshold voltage on pin 11 (which is approximately 1 volt), comparator #4 will switch back to the flash OFF state.

Light sources LED I and LED2 are lit when their respective comparator output pins (2 and 1) are sinked to ground (i.e., the flash ON state). The threshold voltage for the buffer comparators (pins 4 and 6) is approximately 1 volt in the flash ON/OFF state. Current through the LEDs is limited to the Output Sink Current capability of the comparators.

When the centrifugal force is removed (i.e., the bicycle tire stops or is very slowly rotating), S1 will open its short to terminal T3 or T4 and capacitor C1 will being changing toward 3 V. When the voltage on pin 8 reaches the threshold voltage on pin 9 (which is approximately 2 volts in the flashing state), comparator #3 will sink its output (pin 14) to ground, thereby clamping the flasher capacitor C2. The flasher is driven to the flash OFF state extinguishing the LEDs.

The turn-off flasher delay interval is determined by the values of resistor R1 and capacitor C1. Increasing either of these values will increase the delay. The maximum of R1 is limited by the input bias current required by the comparator. The flash OFF time interval is determined by the values of capacitor C2 and resistors R8 and RI0. Increasing any of these values will increase the time period, thereby reducing the flash rate. The maximum value of the sum R8 and R10 is limited by the input bias current required by the comparator. The duration of the flash ON interval (LEDs lit) is determined by the values of capacitor C2 and resistors R8. This interval should be kept short to limit power consumption.

Figure 18A:
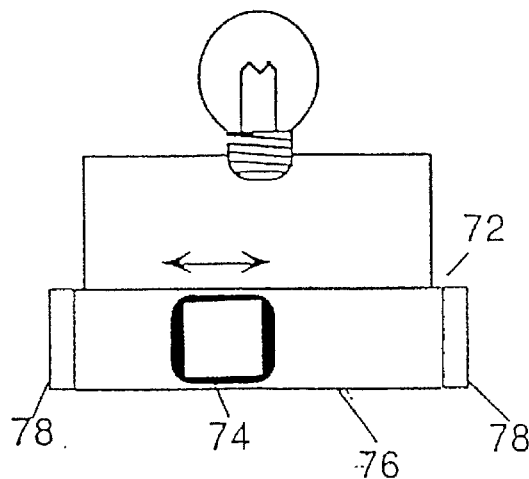
FIG. 18(a) is an isolated view of a piezo-electric generating power source in accordance with the present invention.
Figure 18B:
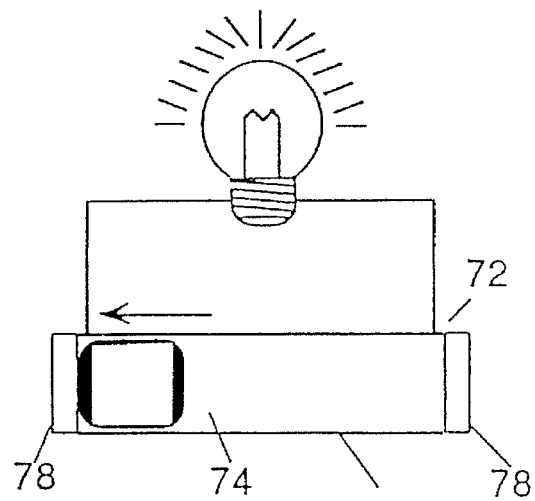
FIG. 18(b) is an isolated view of the piezo-electric generating power source in accordance with the present invention.
Figure 18C:
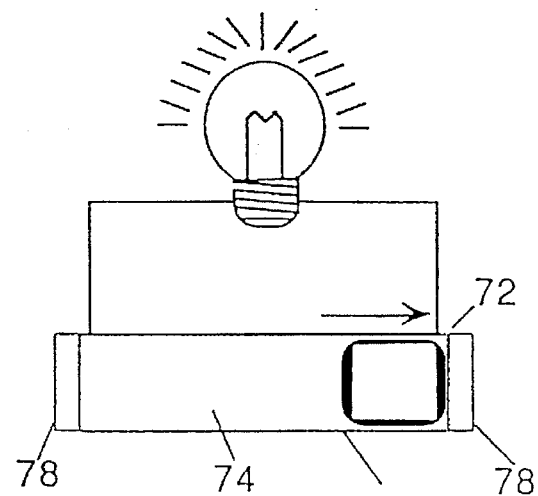
FIG. 18(c) is an isolated view of the piezo-electric generating power source in accordance with the present invention.

In another embodiment of the self-generating energy source, shown in FIGS. 18(a)–18(b), a piezo-electric generating power source 72 is used. In this case, a weight 74 contained within a tube 76 slides back and force due to the cycloid motion of the inventive bicycle safety light mounted on the spokes of a rotating bicycle tire. At each end of the tube 76 is a piezo-electric element 78 which produces an electric current each time the weight bangs into it. The electric current is used to provide a power source to light LED light sources 14.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

We claim:

1. A safety light for a bicycle, comprising: a housing member; a power source; at least one light source supported by the housing member and electrically connectable to the power source; motion switching means for switching between an open condition and a closed condition in response to motion of the housing member; and a control circuit activated dependent on the open and the closed condition of the motion switching means, the control circuit having flashing means for producing a flashing voltage pulse effective to cause the at least one light source to flash an on-off cycle each time the switching means switches between the open condition and the closed condition in response to motion of the housing member and for controlling the flashing means to produce the flashing voltage pulse for a predetermined length of time after detecting a last on-off cycle wherein the housing member comprises a first half shell having an observable surface and engageable with a second half shell having an observable surface for forming in an engaged position a hollow interior therebetween; the at least one light source comprises a first light source positioned in the interior so that an emanating first light is visible through the observable surface of the first half shell and a second light is visible through the observable surface of the second half shell; and wherein the light further comprises mounting means for mounting the housing member on spokes of a bicycle tire the first light is visible when viewing one side of the tire and the second light is visible when viewing another side of the tire.

2. A safety light for a bicycle according to claim 1; wherein the switching means comprises at least one electrical contact and a pivotally supported member disposable in a first position not in contact with the at least one electrical contact and disposable at a second position in contact with the electrical contact depending on the motion of the housing member so that the motion of the housing member causes the at least one light source to switch on and off.

3. A safety light for a bicycle according to claim 1; wherein the switching means comprises at least one electrical contact and a resilient member mounted at one end and disposable in a first position not in contact with the at least one electrical contact and disposable at a second position in contact with the electrical contact depending on the motion of the housing member so that the motion of the housing member causes the at least one light source to switch on and off.

4. A safety light for a bicycle according to claim 3; wherein the switching means further comprises a weight member attached at one end of the resilient member.

5. A safety light for a bicycle according to claim 1; wherein the housing member comprises a first half shell engageable with a second half shell for forming in an engaged position a hollow interior therebetween, and an O ring, sealing a member disposable between engaging surfaces of the first half shell and second half shell for prevent contamination of the interior by moisture and foreign particles.

6. A safety light for a bicycle according to claim 4; wherein the observable surface of at least one of the first half shell and the second half shell comprises at least one of a reflecting surface for reflecting light emanating from the exterior of the housing member and a magnifying surface for magnifying the emanating light.

7. A safety light for a bicycle according to claim 1; wherein the power source comprises a battery; the housing member comprises a first half shell engageable with a second half shell for forming in an engaged position a hollow interior therebetween; and further comprising joining means for disengageably joining the first half shell and the second half shell; and a battery holder supported in the interior and accessible when the first half shell is disengaged from the second half shell for replaceably holding the battery.

8. A safety light for a bicycle according to claim 1; wherein the switching means comprises at least two electrical contacts and a solid moving member disposable between a first position not in contact with at least one of the electrical contacts and a second position in contact with at least two of the electrical contacts depending on the motion of the housing member so that the motion of the housing member causes the at least one light source to switch on and off.

9. A safety light for a bicycle according to claim 1 wherein the moving member comprises a conductive ball member.

10. A safety light for a bicycle according to claim 1; wherein the housing member comprises attaching means for attaching the safety light to the spokes of a bicycle.

11. A safety light for a bicycle, according to claim 1 wherein the power source comprises a magnetic member for providing a magnetic field and a conductive coil disposed relative to the magnetic member so that motion of the magnetic member relative to the conductive coil in response to motion of the housing member produces an electric current for said at least one light source.

12. A safety light for a bicycle according to claim 11; wherein the conductive coil is a hollow cylindrical coil and the magnetic member is disposed inside the hollow cylindrical structure.

13. A safety light for a bicycle according to claim 12; wherein the power source further comprises at least one spring member disposed at one end of the hollow cylindrical coil for storing and releasing momentum of the moving magnetic member.

14. A safety light for a bicycle according to claim 11; wherein the conductive coil is a cylindrical coil and the magnetic member has a through-hole for receiving the cylindrical coil.

15. A safety light for a bicycle according to claim 14; wherein the power source further comprises a second conductive coil having a hollow cylindrical shape, magnetic member being disposed inside the second conductive.

16. A safety light for a bicycle according to claim 11; further comprising a self-lubricating coating disposed on at least one of the surface of the conductive coil and the surface of the magnetic member.

17. A safety light for a bicycle according to claim 16; wherein the self-lubricating coil comprises a lubricating material phase encased in a supportive matrix.

18. A safety light for a bicycle according to claim 11; further comprising a control circuit activated dependent electricity supplied by the power source, the control circuit having flashing means for producing a flashing voltage pulse effective to cause the at least one light source to flash on and off.

19. A safety light for a bicycle according to claim 18; wherein the control circuit further has timing means for detecting an on-off cycle each time the power source generates electricity in response to motion of the housing member and for controlling the flashing means to produce the flashing voltage pulse for a predetermined length of time after detecting a last on-off cycle.

* * * * *